(12) United States Patent
Maity

(10) Patent No.: US 8,532,302 B2
(45) Date of Patent: *Sep. 10, 2013

(54) SYSTEM AND METHOD FOR REGISTERING A PERSONAL COMPUTING DEVICE TO A SERVICE PROCESSOR

(75) Inventor: Sanjoy Maity, Snellvillve, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/307,267

(22) Filed: Nov. 30, 2011

(65) Prior Publication Data

US 2013/0136263 A1 May 30, 2013

Related U.S. Application Data

(63) Continuation of application No. 13/306,194, filed on Nov. 29, 2011.

(51) Int. Cl.
*H04L 9/08* (2006.01)
*G06F 21/31* (2013.01)

(52) U.S. Cl.
USPC .............................................. 380/278; 726/7

(58) Field of Classification Search
USPC ............. 380/278, 279, 277; 713/171; 726/7; 715/237, 255; 710/15, 18
See application file for complete search history.

(56) References Cited

U.S. PATENT DOCUMENTS

| 6,643,775 B1 * | 11/2003 | Granger et al. ............... 713/190 |
| 7,650,411 B2 * | 1/2010 | Cohen .......................... 709/225 |
| 7,966,649 B1 * | 6/2011 | Cooper ............................. 726/2 |
| 8,281,985 B1 * | 10/2012 | Steinmetz et al. ............ 235/379 |
| 8,296,477 B1 * | 10/2012 | Polk ................................ 710/18 |
| 8,479,090 B2 * | 7/2013 | Lemonik et al. .............. 715/234 |
| 2002/0107856 A1 * | 8/2002 | Scheussler et al. ............. 707/10 |
| 2003/0043192 A1 * | 3/2003 | Bouleau ........................ 345/762 |
| 2006/0206709 A1 * | 9/2006 | Labrou et al. ................. 713/167 |
| 2006/0236165 A1 | 10/2006 | Cepulis et al. |
| 2007/0019215 A1 | 1/2007 | Yu |
| 2008/0027875 A1 * | 1/2008 | Adkins et al. .................... 705/76 |
| 2008/0140814 A1 * | 6/2008 | Cohen .......................... 709/220 |
| 2009/0260064 A1 * | 10/2009 | McDowell et al. ............... 726/4 |
| 2010/0115288 A1 * | 5/2010 | Monk et al. ................... 713/189 |
| 2010/0121987 A1 | 5/2010 | Yun |
| 2010/0325423 A1 * | 12/2010 | Etchegoyen .................. 713/153 |

* cited by examiner

*Primary Examiner* — Eleni Shiferaw
*Assistant Examiner* — Abu Sholeman
(74) *Attorney, Agent, or Firm* — Morris Manning & Martin, LLP; Tim Tingkang Xia, Esq.

(57) ABSTRACT

In one aspect, a system for registering a personal computing device to a service processor is disclosed. The system includes a computer-executable first registration module that is executable to perform functions that include providing a device identifier associated with a personal computing device to a service processor over a communications link. The system also includes a computer-executable second registration module that is executable to perform functions that include receiving the device identifier over the communications link and retrieving stored user access data associated with a particular authorized user of the personal computing device who has remote access to the service processor via a management computer. The second registration module is further executable to generate a cryptographic key based on the device identifier and configuration data associated with firmware of the service processor, and to provide the cryptographic key to the personal computing device over the communications link.

17 Claims, 8 Drawing Sheets

DEVICE REGISTRATION

SYSTEM AND METHOD FOR REGISTERING A PERSONAL COMPUTING DEVICE TO A SERVICE PROCESSOR

CROSS-REFERENCE TO RELATED PATENT APPLICATION

This application is a continuation of, and claims benefit of, U.S. patent application Ser. No. 13/306,194, filed Nov. 29, 2011, entitled "SYSTEM AND METHOD FOR CONTROLLING USER ACCESS TO A SERVICE PROCESSOR," by Sanjoy Maity, which is hereby incorporated reference herein in its entirety.

FIELD OF THE INVENTION

The present invention generally relates to secure user access to a service processor. More particularly, the present invention relates to a system and method for registering a personal computing device to a service processor.

BACKGROUND OF THE INVENTION

In a cloud computing environment where numerous server computers and multiple remote users are involved, access to remote computers must be kept highly secure to prevent unauthorized users from interfering with proper operation of the servers or otherwise compromising the integrity of sensitive data in a computer network. In the context of remote management computing, multiple users may require access to a service processor in order to monitor and manage operations of target computers. For example, multiple users may require access to a baseboard management controller (BMC) which operates to monitor health-related aspects of a rack of server computers. One user may have a level of access permission that varies from that of another user. Access permission can be predetermined according to the role of the user as a specific type of employee in a company or according to another type of security hierarchy. For example, a particular local network user may be authorized to manage the settings and actions of a service processor for local email servers, but not to access and manage mission-critical servers such as hospital operations servers, government intelligence servers, or financial institution servers. Conventionally, proximity-based identification devices such as RFID cards have been used for authenticating a particular user. However, these types of conventional identification means may require the use of bulky peripheral devices locally attached at the management computer in order to read the identification information associated with the identification device. As the identification device and associated reading device may be portable by a user from one computing location to another, these security devices are subject to being lost or stolen. Among other needs, there exists a need for secure user authentication to regulate access of multiple computer users to one or more service processors.

Therefore, heretofore unaddressed needs still exist in the art to address the aforementioned deficiencies and inadequacies.

SUMMARY OF THE INVENTION

According to one or more aspects of the present invention disclosed herein in various exemplary embodiments, a system and method are provided for registering a personal computing device to a service processor. By practicing the present invention according to one or more aspects and exemplary embodiments, a personal computing device such as a smartphone is registered to a service processor firmware as an authenticated device. Registration is performed through a secured network environment or using a USB cable connected to the smartphone and the service processor. During the registration process, the firmware and an executable program application on the smartphone exchange a private key for future authentication. Upon successful completion of the registration, the smartphone is an authorized registered device that may be used by a corresponding authorized user who has remote access to the service processor over a management computer that is separate from the smartphone.

In another aspect, the present invention relates to a system for registering a personal computing device to a service processor. In one embodiment, the system includes a computer-executable first registration module that is stored on a personal computing device and configured to, when executed by one or more processors, perform functions that include providing a device identifier associated with the personal computing device to a service processor over a communications link. The system also includes a computer-executable second registration module that is stored on the service processor and configured to, when executed by one or more processors, perform functions that include receiving the device identifier over the communications link and retrieving stored user access data associated with a particular user of the personal computing device who has authorization to remotely access the service processor via a management computer that is separate from the personal computing device. The second registration module is further executable to generate a cryptographic key based on the device identifier and configuration data associated with firmware of the service processor, and to provide the cryptographic key to the personal computing device over the communications link.

In one embodiment, the system further includes a computer-executable management access module that is stored on the service processor. The management access module is operatively coupled to the second registration module and configured to, when executed by one or more processors, perform functions that include: retrieving the device identifier associated with the personal computing device; retrieving the cryptographic key corresponding to the device identifier; and generating an encrypted code based on the cryptographic key. The management access module is further executable to cause the management computer to display a visual representation of the encrypted code to the authorized user. The user access data corresponds to a first set of login information which, when received from the authorized user of the management computer, causes the management computer to display the visual representation of the encrypted code in response. The displayed visual representation of the encrypted code is configured such as to, when recognized by the personal computing device, cause the personal computing device to display a second set of login information to the authorized user which, when received from the authorized user of the management computer, enables the authorized user to access the service processor in response. The first set of login data includes at least one of a username and password associated with the authorized user. The second set of login information as displayed on the personal computing device includes a personal identification number (PIN) associated with the authorized user.

In one embodiment, the encrypted code is generated based on, in part, the current time of day. The visual representation of the encrypted code is displayed as a QR code or barcode. The service processor is configured as a baseboard management controller (BMC) that is operative to perform remote management functions for at least one target computer which is separate from the management computer and personal computing device. The communications link between the personal computing device and the service processor includes at least one of a USB connection, local area network (LAN) connection, wireless area network (WAN) connection, and Internet connection.

In yet another aspect, the present invention relates to a computer-implemented method for registering a personal computing device to a service processor. In one embodiment, the method includes the step of causing one or more processors to execute a first registration module that is stored on a personal computing device to perform functions that include providing a device identifier associated with the personal computing device to a service processor over a communications link. The method further includes the step of causing one or more processors to execute a second registration module on the service processor to perform functions that include: receiving the device identifier over the communications link; retrieving stored user access data associated with a particular user of the personal computing device who has authorization to remotely access the service processor via a management computer that is separate from the personal computing device; generating a cryptographic key based on the device identifier and configuration data associated with firmware of the service processor; and providing the cryptographic key to the personal computing device over the communications link.

In one embodiment, the method further includes the step of causing one or more processors to execute a management access module that is stored on the service processor. The management access module is operatively coupled to the second registration module and is executable to perform functions that include: retrieving the device identifier associated with the personal computing device; retrieving the cryptographic key corresponding to the device identifier; and generating an encrypted code based on the cryptographic key. The method further includes the step of causing the management computer to display a visual representation of the encrypted code to the authorized user. The user access data corresponds to a first set of login information which, when received from the authorized user of the management computer, causes the management computer to display the visual representation of the encrypted code in response. The displayed visual representation of the encrypted code is configured such as to, when recognized by the personal computing device, cause the personal computing device to display a second set of login information to the authorized user which, when received from the authorized user the management computer, enables the authorized user to remotely access the service processor in response.

In one embodiment, the method includes the step of causing the first registration module to receive the cryptographic key from the second registration module over the communications link and to securely store the cryptographic key on the personal computing device. The cryptographic key, device identifier, and user access data are securely stored on the service processor.

In one embodiment, the personal computing device corresponds to a portable wireless communications device, for example a smartphone, and the device identifier corresponds to the predetermined international mobile equipment identity (IMEI) of the personal computing device.

In yet another aspect, the present invention relates to a computer-implemented method for registering a personal computing device to a service processor. In one embodiment, the method includes the step of installing a computer-executable first registration module on a personal computing device.

The first registration module is configured to, when executed by one or more processors, cause the personal computing device to perform functions that include providing a device identifier associated with the personal computing device to a service processor over a communications link. The method also includes the step of installing a computer-executable second registration module on the service processor. The second registration module is configured to, when executed by one or more processors, cause the service processor to perform functions that include: receiving the device identifier over the communications link; retrieving stored user access data associated with a particular user of the personal computing device who has authorization to remotely access the service processor via a management computer that is separate from the personal computing device; generating a cryptographic key based on the device identifier and configuration data associated with firmware of the service processor; providing the cryptographic key to the personal computing device over the communications link; and causing one or more processors to execute the first registration module and second registration module.

In one embodiment, the method further includes the step of installing a computer-executable management access module on the service processor. The management access module is operatively coupled to the second registration module and is configured to, when executed by one or more processors, cause the service processor to perform functions that include: retrieving the device identifier associated with the personal computing device; retrieving the cryptographic key corresponding to the device identifier; and generating an encrypted code based on the cryptographic key. The method also includes the step of causing the management computer to display a visual representation of the encrypted code to the authorized user. The user access data corresponds to a first set of login information which, when received from the authorized user of the management computer, causes the management computer to display the visual representation of the encrypted code in response. The displayed visual representation of the encrypted code is configured such as to, when recognized by the personal computing device, cause the personal computing device to provide a second set of login information to the authorized user. When it is received from the authorized user of the management computer, the entered second set of login information enables the authorized user to remotely access the service processor in response.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
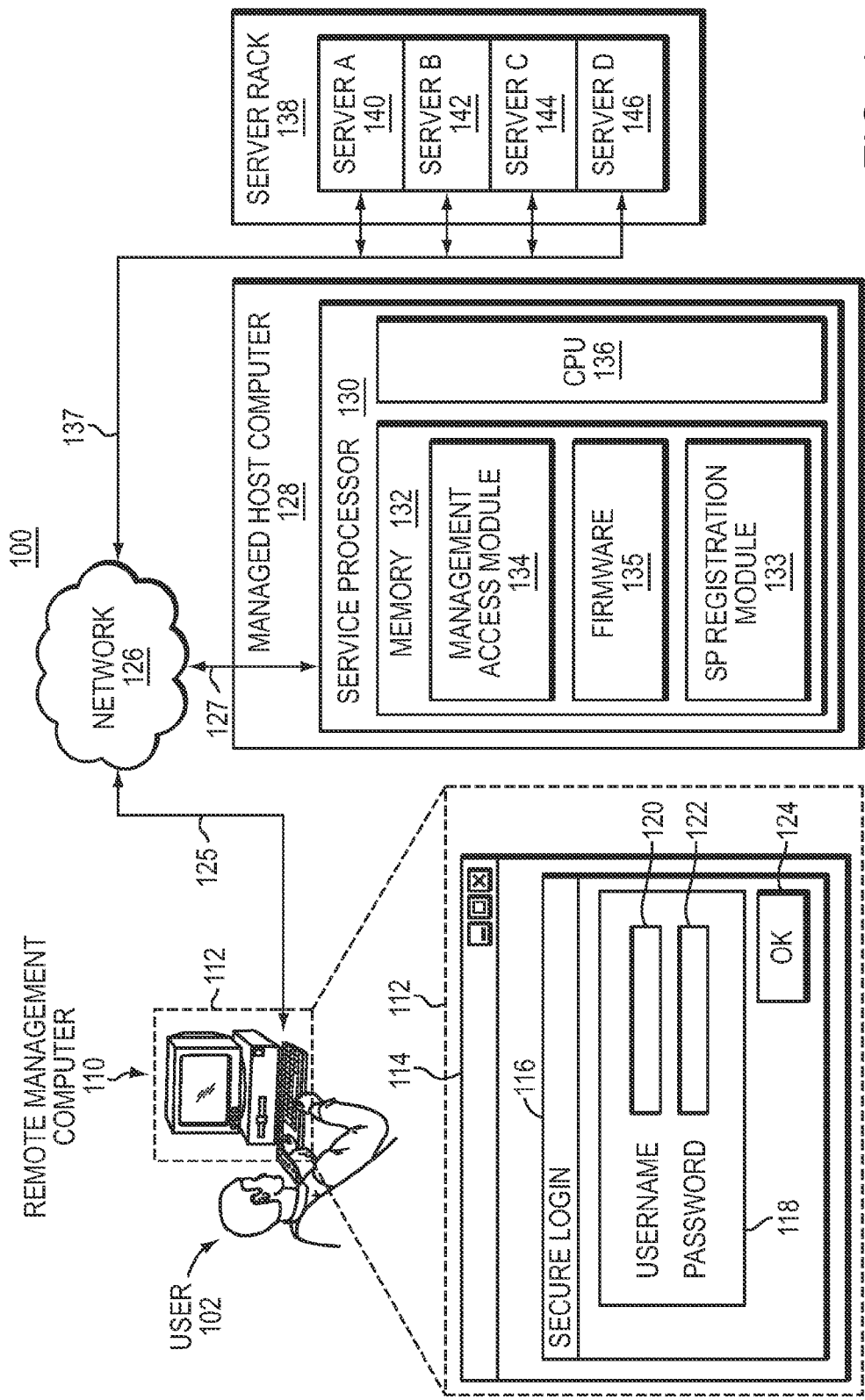
FIG. 1 schematically shows a system for managing user access to a service processor, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "service processor" refers to a programmable controller such as a baseboard management controller (BMC) that is employed to monitor and detect operating and performance-related parameters associated with a computer system and its constituent components, where the computer system may include one or more target computers, for example multiple server computers in a server rack located at a data center. Many of the various components comprising a computer system must operate within a range of parameters defined by performance protocols or standards. The temperature within a chassis, for instance, is often monitored in order to detect periods when the system rises above or falls below a certain predetermined temperature reading. Other types of parameters of a computer system that may be monitored include voltages associated with semiconductor components located on the baseboard (also known as the "motherboard") of the system, velocity of rotation of cooling fans on the baseboard or within the system chassis, and velocity of spindle motors within hard disk drives or optical drives. Various types of sensors are employed to detect the operating and performance-related parameters associated with the computer system. A management controller typically encompasses both hardware and software components. A BMC is a microcontroller on the baseboard of a computer system, with a number of contact pins through which information sensed by various sensors is received for analysis. The BMC is configured with firmware for implementing procedures relating to system monitoring and recovery. With the firmware, the BMC is programmed to monitor various operating and performance-related parameters sensed within the computer system and to analyze the information to determine whether any of the sensed parameters are outside of an expected or recommended operating range, the occurrence of which is commonly referred to as an "event." A service processor can be utilized for configuring and managing aspects of the operation of one or more target computers, using associated configuration tools.

As used herein, "module" refers generally to a storable, computer-executable program containing instructions which, when executed by one or more processors, cause a computing device to perform specific computing tasks such as executing data processing routines or various particular types of abstract data. As used herein, "user module" refers to a computer-executable program module that is executable on a smartphone or other type of personal computing device such as a laptop or desktop computer with image capturing and processing capabilities. The user module may be installed on the personal computing device after a direct download of the program module has taken place. Alternatively, the program module may be installed in a hardware chip or other type of storage means that is provided separately from the factory-standard components of the device.

As used herein, "smartphone" refers to a mobile phone that can combine the functions of a personal digital assistant and a mobile telephone. A smartphone is capable of wireless communications for both telephone functions and computing. Current smartphones such as BlackBerry®, Android®, and iPhone® models are further capable of executing task-specific program modules, sometimes referred to as "apps." These models may include digital camera components for capturing and processing images.

As used herein, a Quick Response code ("QR code") refers to a type of matrix barcode or two-dimensional code designed to be read by smartphones or other personal computing devices with image capturing and processing capabilities. A QR code typically has black modules arranged in a square pattern on a white background. The information encoded may be text, a Uniform Resource Locator (URL), or other data. QR codes are currently used in commercial contexts ranging from shipment tracking to consumer product marketing and labeling. Users with a personal computing device that is capable of image capturing and processing can capture the image of the QR code such that the personal computing device will perform specific functions for its user in response, for example displaying text, providing contact information, connecting to a wireless network, or opening a web page in a browser.

Figure 2:
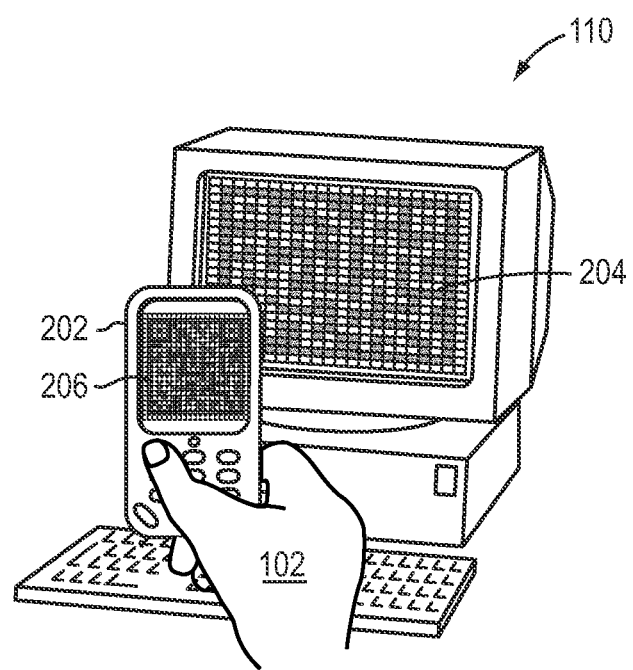
FIG. 2 illustrates a user capturing an image of a code displayed on a management computer, according to one embodiment of the present invention.

Now referring specifically to FIGS. 1 and 2, FIG. 1 schematically shows a system for managing user access to a service processor, according to one embodiment of the present invention, and FIG. 2 illustrates a user capturing an image of a code displayed on a management computer, according to one embodiment of the present invention.

As shown in FIG. 1, a system 100 includes a remote management computer 110 being operated by a user 102. As shown in the enlarged view of a selected area 112 of the remote management computer 110, a web-based application 114 displays a secure login prompt 116 with a box 118 encompassing input controls in the form of two text input boxes 120 and 122 and an OK button 124. Those skilled in the art will recognize that such display prompts and input controls are commonly used in the field of network computing. Displayed input prompt screens and controls are common in operating systems using a graphical user interface, such as the Windows® operating system from Microsoft® Corporation. The management computer 110 shown in FIG. 1 is communicatively coupled to a service processor 130 via a communication link 125, 126, and 127. Communications links may be operatively coupled at one or more network interfaces at each of the management computer 110, the managed host computer 128 and/or the service processor 130. Although communication links 125, 127, and 137 are represented in FIG. 1 by solid lines, the communication links utilized may take the form of network-type cables in a local area network (LAN) 126 architecture and additionally or alternatively one or more wireless network communication paths within a wireless area network (WAN), Wi-Fi, or Wi-Max architecture. For example, the communication links 125 and 127 may represent communication paths of wireless signal transmissions being routed between the network connection 126, which may be a wireless network hub or router connected to the Internet, and the management computer 110 and service processor 130.

As shown in the embodiment of FIG. 1, the service processor 130 is provided within the managed host computer 128. The service processor 130 encompasses a memory device 132, such as a flash memory device, and a central processing unit (CPU) 136. As shown, the memory device 132 contains a firmware 135 and a management access module 134 that may be stored as a flash image. Further, the service processor 130 includes a service processor ("SP") registration module 133 for performing device registration functions that will be described in further detail below with reference to FIGS. 6 and 7. As described above, the service processor 130 corresponds to a type of programmable controller used to monitor and detect operating and performance-related parameters associated with a computer system and its constituent components. For performing analysis functions, the service processor 130 is configured with the firmware 135 for implementing procedures relating to system monitoring and recovery. With the firmware 135, the service processor 130 is programmable to monitor various operating and performance-related parameters sensed within a computer system, such as the managed host computer 128 and/or server computers 140, 142, 144, and 146 in server rack 138. The service processor 130 may be programmed to analyze collected information to determine whether any of the sensed parameters are outside of an expected or recommended operating range. The service processor 130 is also programmable to use various configuration tools to manage aspects of the operation of the host computer 128 and/or server computers 140, 142, 144, and 146.

The management access module 134 is configured to, when executed by one or more processors such as CPU 136 and/or CPU 422 (see FIG. 4), cause the management computer 110 to perform specific functions for authenticating the user 102. As shown in FIG. 1, the management computer 110 is communicatively coupled to the service processor 130 to perform management functions for at least one target computer such as the host computer 128. Further, the management computer 110 is communicatively coupled by the communication link 137 to the server rack 138, which encompasses Server-A 140, Server-B 142, Server-C 144, and Server-D 146. One or more of the servers 140, 142, 144, 146 may be mission-critical servers handling highly sensitive data or related high-security functions associated with hospital operations, government intelligence, or financial institutions, for example. One or more of the server computers 140, 142, 144, 146 in the server rack 138 may have a corresponding service processor of their own (not shown) for performing management functions such as monitoring and configuring performance aspects of the respective server computer and/or other server computers in a rack. Accordingly, it should be appreciated that the management computer 110 may also be operative to manage user access to one or more other service processors in the system 100 for which a particular user is authorized to access.

The functions for authenticating the user 102 include: (i) receiving a first set of login data from the user 102, for example a login and password associated with the particular user; (ii) verifying whether the received first set of login data corresponds to an approved user of the management computer 110; (iii) if the first set of login data corresponds to an approved user, generating and displaying a code 204 on the management computer 110 that is configured to be recognized only by a personal computing device 202, wherein the personal computing device 202 being associated with the approved user and separate from the management computer 110. The displayed code 204 has visual representations of data which, when recognized by the personal computing device 202, cause the personal computing device 202 to provide login information such as a personal identification number (PIN) to the user 102, for permitting the user 102 to access the service processor 130; (iv) receiving a second set of login data from the user 102, for example the PIN, and verifying whether the received second set of login data corresponds to the login information for permitting the user 102 to access to the service processor 130, for example whether the PIN received from the user 102 corresponds to the username and password entered as the first set of login data; and (v) if the second set of login data corresponds to the login information for permitting the user 102 to access to the service processor 130, providing the user 102 with access to the service processor 130 via the management computer 110.

FIG. 2 illustrates a user 102 employing a personal computing device 202 to capture an image 206 of a QR code 204 as displayed on the management computer 110. The QR code, which may alternatively be a barcode or other type of visual representation of encrypted data, is dynamically generated by the management access module 134 based on one or more user-specific details that are already known within the secure side of the management computer system, which may include particular information associated with the firmware of one or more of the service processors used by that approved user and/or a unique identifier for the personal communication device carried by the particular user corresponding to the specific username and password. In the exemplary context of a smartphone, the unique identifier may correspond to the predetermined international mobile equipment identity (IMEI). The QR code may also be generated based on the current time of day such that the particular QR code with the embedded PIN information is only available to be captured and deciphered for a limited period of time. The QR code may be generated according to known cryptographic protocols for security, using encryption algorithms such as SHA, MD2, MD5, or Blowfish.

Figure 3:
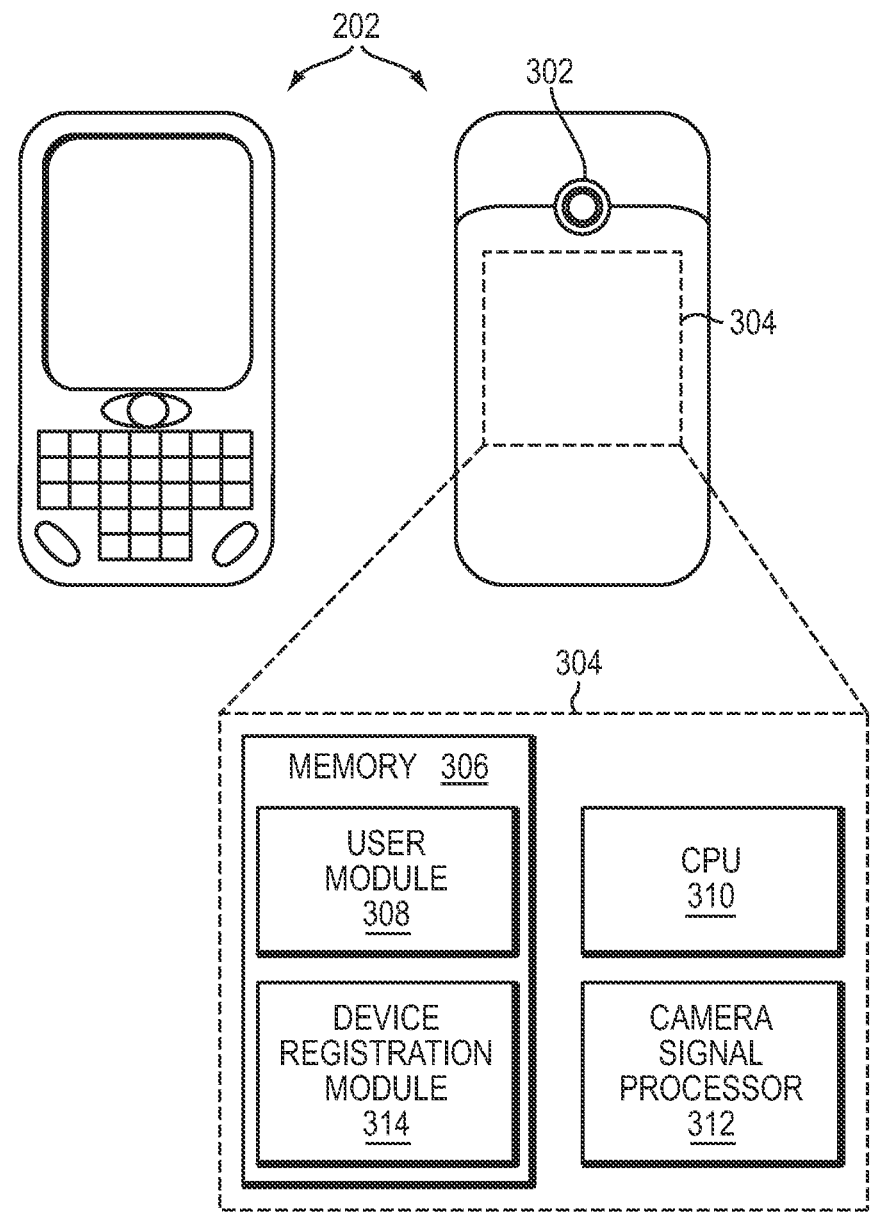
FIG. 3 schematically shows a personal computing device utilized to perform various functions according to one or more embodiments of the present invention.

FIG. 3 shows a smartphone-type personal computing device 202 for performing various functions according to one or more embodiments of the present invention. An enlarged view 304 of a selected area of the personal computing device 202 depicts selected internal components, and particularly a memory device 306 storing a user module 308, a camera signal processor 312, and a central processing unit (CPU) 310. In this embodiment, a digital camera component 302 is operative to capture the image of a displayed QR code on the management computer 110, as shown in FIG. 2. The stored user module 308 contains computer-executable instructions which, when executed by one or more processors such as the CPU 310 and/or camera signal processor 312, cause the personal computing device 202 to process and recognize the visual representations of data in a captured image of the QR code (see FIG. 2) and, in response, display login information such as a PIN for permitting the user to access the service processor (see FIGS. 1 and 2). The functions of processing and recognizing the data in the code are performed in response to receiving image data corresponding to the image of the code captured by the personal computing device 202. As shown, the memory device 306 also stores a device registration module 314 for performing functions that will be described below with reference to FIGS. 5A, 5B, 6, and 7.

Those skilled in the art will recognize that other personal computing devices such as personal laptop computers are operable to run computer program modules for task-specific applications such as the functions performed by the user module described with reference to the embodiments shown in FIGS. 1-3. Further, those skilled in the art will recognize that it is common for portable computing devices other than smartphones to have means for capturing digital images and processing image data. Thus, various types of portable computing devices such as personal laptop computers with digital image capture capability and image processing capability may be included within the scope of "personal computing device" as used herein.

Figure 4:
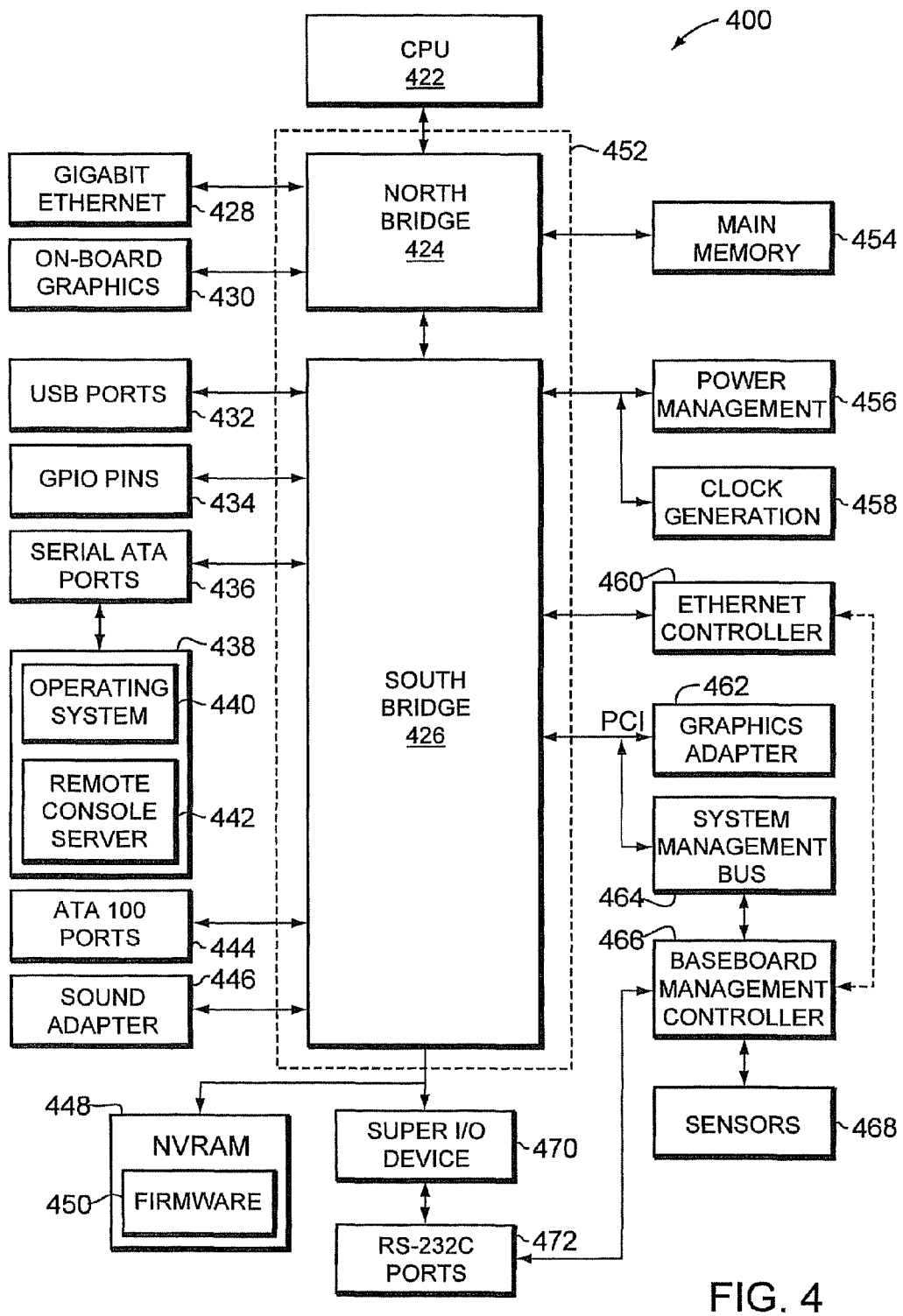
FIG. 4 schematically shows computer architecture for various computing systems utilized according to one or more embodiments of the present invention.

Now referring specifically to FIG. 4, computer architecture of an exemplary computing system is shown, which may be utilized according to one or more embodiments of the present invention. The architecture shown in FIG. 4 corresponds to a computer 400 having a baseboard, or "motherboard," which is a printed circuit board to which components or devices may be connected by way of a system bus or other electric communication path. In one embodiment, a central processing unit (CPU) 422 operates in conjunction with a chipset 452. The CPU 422 is a standard central processor that performs arithmetic and logical operations necessary for the operation of the computer 400. It should be appreciated that the computer 400 may include additional processors to work in conjunction with the CPU 422.

The chipset 452 includes a north bridge 424 and a south bridge 426, where the north bridge 424 provides an interface between the CPU 422 and the remainder of the computer 400. The north bridge 424 also provides an interface to a random access memory (RAM) used as the main memory 454 in the computer 400 and, optionally, to an onboard graphics adapter 430. The north bridge 424 may also include functionality for providing networking functions through a network adapter 428, shown in FIG. 4 as an Ethernet adapter. The network adapter 428 is operative to connect the computer 400 to one or more other computers via network connections. Connections which may be made by the network adapter 428 include local area network (LAN) or wireless area network (WAN) connections. Those skilled in the art will recognize that LAN and WAN networking environments are commonplace in offices, enterprise-wide computer networks, intranets, and internet-based network architecture. As shown, the north bridge 424 is connected to the south bridge 426.

The south bridge 426 is operative to control input/output functions of the computer 400. In particular, the south bridge 426 may provide one or more universal serial bus (USB) ports 432, a sound adapter 446, a network controller 460 shown as an Ethernet controller, and one or more general purpose input/output (GPIO) pins 434. The south bridge 426 may also provide a bus for interfacing peripheral card devices such as a graphics adapter 462. In one embodiment, the bus comprises a peripheral component interconnect (PCI) bus. The south bridge 426 may also provide a system management bus 464 for use in managing the various components of the computer 400, and a power management module 456.

The south bridge 426 is also operative to provide one or more interfaces for connecting mass storage devices to the computer 400. For instance, according to an embodiment, the south bridge 426 includes a serial advanced technology attachment (SATA) adapter for providing one or more serial ATA ports 436 and an ATA-100 adapter for providing one or more ATA-100 ports 444. The serial ATA ports 436 and ATA-100 ports 444 may be, in turn, connected to one or more mass storage devices, such as a SATA disk drive 438 storing an operating system 440 and application programs. Those skilled in the art will recognize that an operating system 440 has a set of programs that control operations of a computer and allocation of resources. An application program is software that runs on top of the operating system software, or other runtime environment, and uses computer resources to perform application-specific tasks desired by the user. A remote console server application 442 is stored on the drive 438 and executed by the computer 400 to redirect the text or graphical display of the computer 400 once the operating system and remote console server application 442 have been loaded.

According to one embodiment, the operating system 440 corresponds to a WINDOWS® operating system and the remote console server application 442 includes a remote desktop application compatible with remote desktop protocol (RDP). According to an alternative embodiment, the operating system 440 corresponds to a LINUX® operating system and the remote console server 442 includes a server that is compatible with the SDP protocol for providing a redirect text display. It should be appreciated that other types of remote desktop servers that are compatible with other types of remote desktop protocols may also be utilized.

Mass storage devices connected to the south bridge 426, and their associated computer-readable media, provide non-volatile storage for the computer 400. Although the description of computer-readable media contained herein refers to a mass storage device such as a hard disk drive, those skilled in the art will recognize that computer-readable media can be any available media that can be accessed by the computer 400. Computer-readable media may include computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 400.

A low pin count ("LPC") interface may also be provided by the south bridge for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that are operative to start up the computer 400 and to transfer information between elements within the computer 400. It should be appreciated that during execution of BIOS and POST portions of the firmware 450, text screen displays of the computer 400 may be provided via serial ports or a network controller using serial-over-LAN protocol.

The south bridge 426 may include a system management bus 464. The system management bus 464 may be operatively associated with a baseboard management controller (BMC) 466. In general, the BMC 466 is a microcontroller that monitors operation of the computer system 400. In a more specific embodiment, the BMC 466 monitors health-related aspects associated with the computer system 400, such as the temperature of one or more components of the computer system 400, speed of rotational components (e.g. spindle motor, CPU fan, etc.) within the system, the voltage across or applied to one or more components within the system 400, and the available or used capacity of memory devices within the system 400. To accomplish these monitoring functions, the BMC 466 is communicatively connected to one or more components by way of the management bus 464. In one exemplary embodiment, these components include sensor devices for measuring various operating and performance-related parameters within the computer system 400. It should be appreciated that the management bus 464 may include components other than those explicitly shown in FIG. 4. In one embodiment, the management bus 464 is an I2C bus. It should be appreciated that several physical interfaces exist for communicating with the BMC 466 in addition to the management bus 464. Serial ports and a network controller may be utilized to establish a connection with the BMC 466.

The management bus 464 is used by the BMC 466 to request and/or receive various operating and performance-related parameters from one or more components, which are also communicatively connected to the management bus 464. For instance, in one embodiment, the management bus 464 communicatively connects the BMC 466 to a CPU temperature sensor and a CPU fan (not shown in FIG. 4), thereby providing a means for the BMC 466 to monitor and/or control operation of these components. The BMC 466 may be directly connected to sensors 468. The serial ports 472 and the Ethernet controller 460 may be utilized to establish a connection with the BMC 466.

According to one embodiment, firmware of the BMC 466 adheres to the Intelligent Platform Management Interface (IPMI) industry standard for system monitoring and event recovery. The IPMI specification provides a common message-based interface for accessing all of the manageable features in the computer 400. IPMI includes a set of predefined commands for reading temperature, voltage, fan speed, chassis intrusion and other parameters. System event logs, hardware watchdogs, and power control can also be accessed through IPMI. In this manner, IPMI defines protocols for accessing the various parameters collected by the BMC 466 through the operating system 440 or through an external connection, such as through a network or serial connection.

It should be appreciated that although the computer 400 shown in the embodiment of FIG. 4 is described in the context of a server computer, other types of computer system configurations may be used, such as handheld communications devices, multiprocessor systems, minicomputers, or personal desktop or laptop computers. It is also contemplated that the computer 400 may not include all of the components shown in FIG. 4 and/or may include other components that are not explicitly shown in FIG. 4.

Figure 5A:
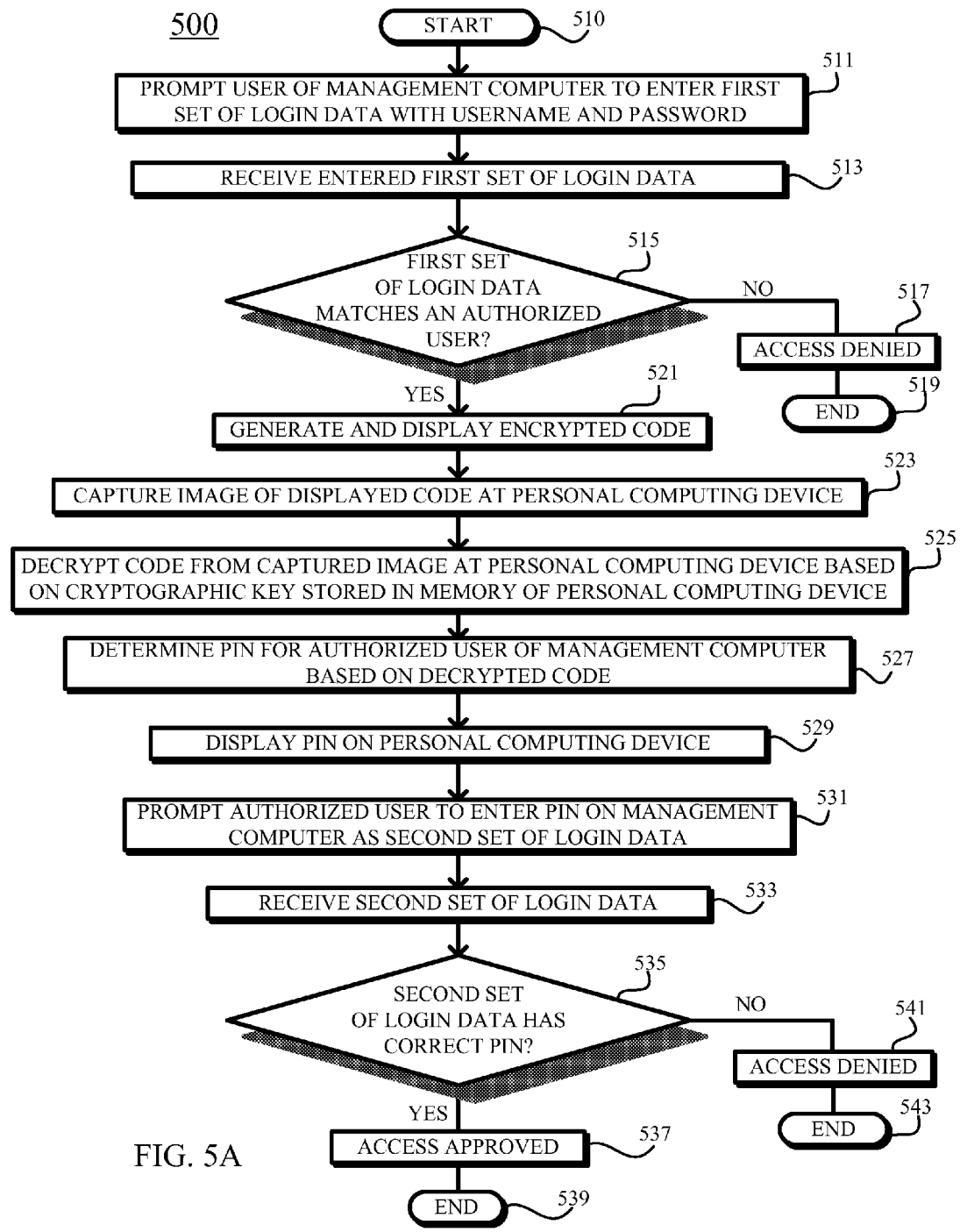
FIG. 5A is a flow chart illustrating operational steps of a method for managing user access to a service processor, according to one embodiment of the present invention.
Figure 5B:
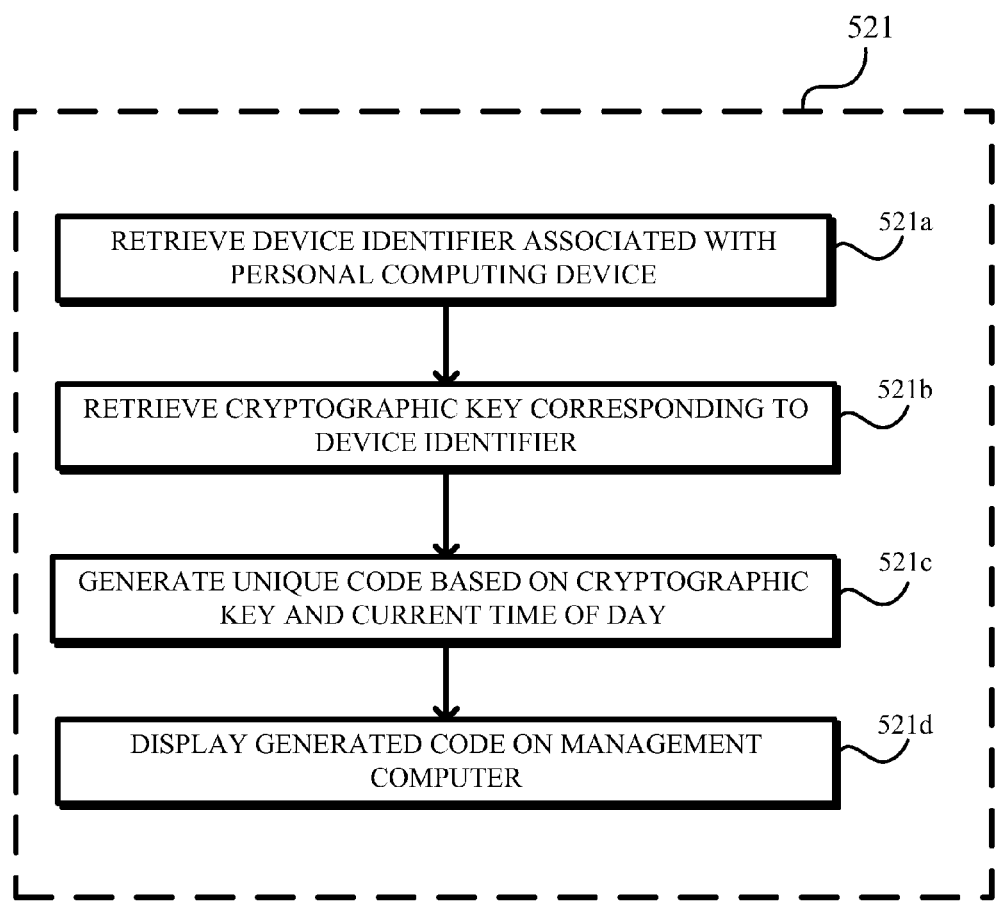
FIG. 5B is a flow chart illustrating a particular step of method shown in FIG. 5 in further detail.

Now referring specifically to FIGS. 5A and 5B, a flow chart illustrates operational steps of a method 500 for managing user access to a service processor, according to one embodiment of the present invention. The method 500 starts at step 510 and includes step 511, where a user of a management computer is prompted to enter a first set of login data, including a username and password. Next, at step 513 the management computer receives the entered first set of login information, and then at step 515 a determination is made whether the first set of login data received from the user is associated with a person that has previously been approved to remotely access one or more network-connected service processors. In performing the determination at step 515, a reference check may be conducted using a table of data stored within the system, the table containing a list of approved users and their respective usernames and passwords. In this example, the table may also contain the unique identification number that corresponds to the particular personal computing device of the user, where no two personal computing devices have the same identification number.

Those skilled in the art will recognize that in the context of a smartphone, each individual smartphone has a unique international mobile equipment identity (IMEI) commonly used to identify GSM, WCDMA, and iDEN mobile phones. Accordingly, the stored data table may contain the login information and device identification associated with one or more users that have already been given certain access privileges.

If the first set of login data does not match with any approved user, access is denied, as shown by the "No" path from step 515 to step 517, and the method ends at step 519. If the first set of login data does match with approved user, then the method proceeds along the "Yes" path from step 515 to step 521. Now referring also to FIG. 5B, step 521 encompasses steps 521*a-d*. At step 521*a*, the device identifier associated with the personal computing device is retrieved. Next, a cryptographic key corresponding to the device identifier is retrieved, at step 521*b*. A unique encrypted code based on the cryptographic key and current time of day is then generated, at step 521*c*. Next, at step 521*d*, the management computer displays a visual representation of the encrypted code to the authorized user, which may be a QR code or a barcode. Referring again to FIG. 5A, at step 523, the user employs an image capturing means, such as a digital camera, on the personal computing device to capture an image of the encrypted code that has been displayed on the management computer. Next, at step 525 the encrypted code contained in the captured image is decrypted at the personal computing device, based on the cryptographic key stored in memory of the personal computing device. Then, at step 527, the received image data is processed to identify a personal identification number (PIN) to be entered by the user as a second set of login data. The PIN is displayed to the user on the personal computing device, at step 529. The user looks on the display screen of the personal computing device to see the PIN. At step 531, the management computer prompts the user to enter the PIN as a second set of login data.

The user enters the PIN at the management computer, as prompted, and corresponding PIN data is received at step 533. From step 533, the method proceeds to step 535, where a determination is made whether the PIN received from the user matches with the identity of the approved user as determined from the first set of login data. If the PIN does match, then the method proceeds along the "Yes" path to step 537, where the user is granted access to one or more service processors via the management computer, and then operation of the method ends at step 539. If the PIN does not match, then the method proceeds from step 535 along the "No" path to step 541, where user access is denied and the method ends at step 543.

Figure 6:
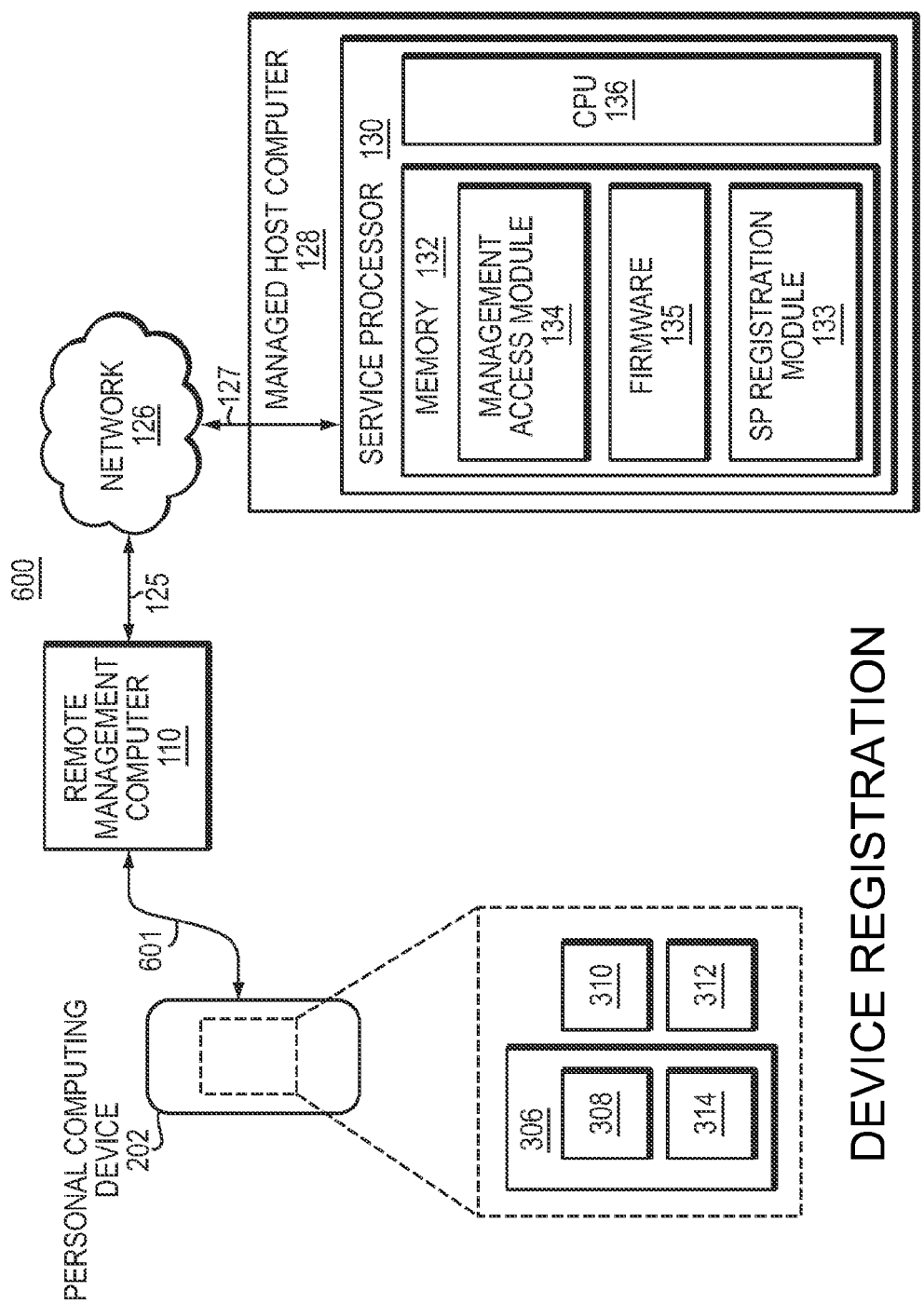
FIG. 6 shows a system for registering a personal computing device to a service processor, according to one embodiment of the present invention.
Figure 7:
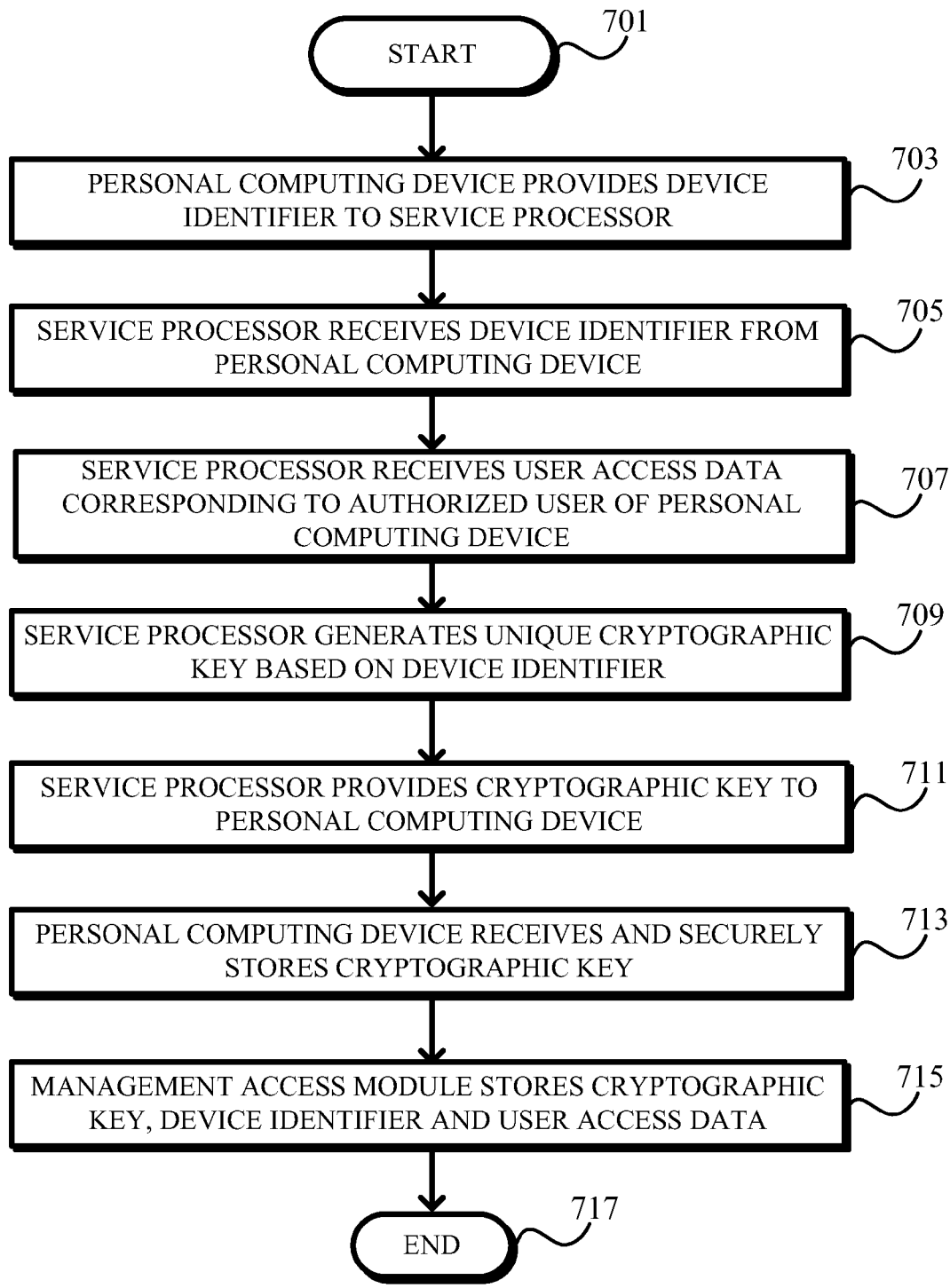
FIG. 7 is a flow chart illustrating operational steps of a method for registering a personal computing device to a service processor, according to one embodiment of the present invention.

Now referring also to FIGS. 6 and 7, according to one or more aspects of the present invention, a system 600 and method 700 are provided for registering a personal computing device 202 to a service processor 130. According to one embodiment, a personal computing device 202, such as a smartphone, is registered with a service processor firmware 135 as an authenticated device. Registration is performed through network communication links in a secured network environment or using a USB cable 601 connecting the smartphone 202 to the service processor 130. During this registration process, the firmware 135 and an executable program application 314 on the smartphone 202 exchange a private key for future authentication. Upon successful completion of the registration, the smartphone 202 is an authorized registered device that may be used by a corresponding authorized user 102 who may remotely access the service processor 130 over a management computer 110 that is separate from the smartphone 202.

A device registration system 600 is shown in FIG. 6 as including a computer-executable first registration module ("device registration module") 314 that is stored on the personal computing device 202 and configured to, when executed by one or more processors (see, e.g. CPU 136 and/or CPU 422), perform functions that include providing a device identifier associated with the personal computing device 202 to a service processor 130 over a communications link. In the embodiment of FIG. 6, the communications link is comprised of a USB cable 601 from the personal computing device 202 to the management computer 110, a network communication link 125 from the management computer 110 to a network connection 126, and a network communication link 127 from the network connection 126 to the service processor 130. The system 600 also includes a computer-executable second registration module ("SP registration module") 133 that is stored on the service processor 130. The second registration module 133 is configured to, when executed by one or more processors (see, e.g. CPU 136 and/or CPU 422), perform functions that include receiving the device identifier over the communications link 601 and 125-127. The second registration module 133 is also executable to retrieve stored user access data associated with a particular user 102 of the personal computing device 202 who has authorization to remotely access the service processor 130 via a management computer 110, wherein the management computer 110 is separate from the personal computing device 202. The second registration module 133 is executable to generate a cryptographic key based on the device identifier and configuration data associated with firmware 135 of the service processor 130, and is also executable to provide the cryptographic key to the personal computing device 202 over the communications links 601 and 125-127. The device registration system 600 also includes a computer-executable management access module 134 that is stored on the service processor 130 and operatively coupled to the second registration module 133. The management access module 134 is configured to, when executed by one or more processors (see, e.g. CPU 136 and/or CPU 422), perform functions that include retrieving the device identifier associated with the personal computing device 202, retrieving the cryptographic key corresponding to the device identifier, and generating an encrypted code based on the cryptographic key.

FIG. 7 is a flow chart which illustrates operational steps of a method 700 for registering a personal computing device to a service processor, according to one embodiment of the present invention. The method 700 begins at step 701, and next at step 703, a personal computing device provides a device identifier corresponding to a personal computing device to a service processor. Then, the service processor receives the device identifier from the personal computing device, at step 705. User access data is then retrieved by the service processor, wherein the user access data corresponds to an authorized user of the personal computing device, at step 707. At step 709, the service processor generates a unique cryptographic key based on the device identifier, and at step 711 the service processor provides the cryptographic key to the personal computing device. Next, at step 713, the personal computing device receives and securely stores the cryptographic key, and then at step 715, a management access module on the service processor stores the cryptographic key, device identifier, and user access data. The method ends at step 717.

Now referring again to the embodiments shown in FIGS. 1-7, in one aspect the present invention relates to a system 100 for managing user access to service processor 130. In one embodiment, the system 100 includes a management access module 134 that is configured to, when executed by one or more processors (CPU 136 and/or CPU 422), cause a management computer 110 to perform functions for authenticating a user 102. The management computer 110 is communicatively coupled to the service processor 130, which is operative to perform management functions for at least one target computer 128. The functions for authenticating the user 102 include receiving a first set of login data from the user 102 (see FIG. 5, step 513) and verifying whether the received first set of login data corresponds to an approved user of the management computer 110 (see FIG. 5, step 515). The functions for authenticating the user further include, if the first set of login data corresponds to an approved user, generating and displaying a code 204 on the management computer 110 that is configured to be recognized only by a personal computing device 202 which is associated with the approved user (see FIG. 5, step 521). As shown, the personal computing device is separate from the management computer 110. The displayed code 204 has visual representations of data which, when recognized by the personal computing device 202, cause the personal computing device 202 to provide login information to the user 102 for permitting the user 102 to access the service processor 130 (see FIG. 5, step 529). The functions for authenticating the user also include receiving a second set of login data from the user 102 (see FIG. 5, step 533) and verifying whether the received second set of login data corresponds to the login information for permitting the user 102 to access to the service processor 130 (see FIG. 5, step 535). If the second set of login data corresponds to the login information for permitting the user 102 to access to the service processor 130, the function of providing the user 102 with access to the service processor 130 via the management computer 110 (see FIG. 5, step 537) is performed.

In one embodiment, the system also includes a user module 308 configured to, when executed by one or more processors (CPU 310 and/or camera signal processor 312), cause the personal computing device 202 to process and recognize the visual representations of data in the displayed code 204 and, in response, display on the personal computing device 202 the login information for permitting the user 102 to access to the service processor 130. In one embodiment, the personal computing device 202 corresponds to a smartphone.

In one embodiment, the functions of processing and recognizing the visual representations of data in the code 204 are performed in response to receiving image data corresponding to an image 206 of the code 204 captured by the personal computing device 202, wherein the personal computing device 202 has a means 302 for capturing the image 206 of the code 204 in response to an action of the user 102. In one embodiment, the functions of receiving the first set of login data (see FIG. 5, step 513), displaying the code 204 on the management computer 110 (see FIG. 5, step 521), providing the login information to the user 102 for permitting access to the service processor 130 (see FIG. 5, step 529), and receiving the second set of login data (see FIG. 5, step 533) are performed via a web-based application 114 executing on the management computer 110, over a network communications link 125, 126, 127 between the management computer 110 and the service processor 130. The web-based application 114 is operative to provide a graphical user interface (GUI) with interactive user controls (see controls input boxes 120, 122, for example) displayed on the management computer 110 for receiving the first set of login data and second set of login data in response to an interaction of the user 102 with the controls 120, 122.

In one embodiment, the management computer 110 is communicatively coupled to the service processor 130 over a network communications link 125, 126, 127. The first set of login data includes at least one of a username and password associated with an approved user of the management computer 110. The service processor 130 is configured as a baseboard management controller (BMC) that is operative to perform the management functions for the at least one target computer 128.

In another aspect, the present invention relates to a system 100 for managing user access to a baseboard management controller (BMC) 130. In one embodiment, the system includes a management access module 134 that is configured to, when executed by one or more processors (CPU 136 and/or CPU 422), cause a web-based application 114 executing on a management computer 110 to perform functions for authenticating a user 102. The management computer 110 is communicatively coupled to the BMC 130 over a network communications link 125, 126, 127. The BMC 130 is operative to perform management functions for at least one target computer 128. The functions for authenticating the user 102 include receiving a first set of login data from the user 102 (see FIG. 5, step 513), verifying whether the received first set of login data corresponds to an approved user of the management computer 110 (see FIG. 5, step 515) and, if the first set of login data corresponds to an approved user, generating and displaying a code 204 on the management computer 110 that is configured to be recognized only by a smartphone 202 associated with the approved user (see FIG. 5, step 521). In one embodiment, the first set of login data includes at least one of an IPMI username and password associated with an approved user of the management computer 110.

The displayed code 204 has visual representations of data which, when recognized by the smartphone 202, cause the smartphone 202 to provide login information to the approved user for accessing the BMC 130 (see FIG. 5, step 529). The functions for authenticating the user 102 further include receiving a second set of login data from the approved user (see FIG. 5, step 533) and verifying whether the received second set of login data corresponds to the login information for the user 102 to access the BMC 130 (see FIG. 5, step 535), and, if the second set of login data corresponds to the login information for permitting the user 102 to access to the BMC 130, providing the user 102 with access to the BMC 130 via the management computer 110 (see FIG. 5, step 537).

The system 100 also includes a user module 308 (see FIG. 3) that is configured to, when executed by one or more processors (CPU 310 and/or camera signal processor 312), cause the smartphone 202 to process and recognize the visual representations of data in the displayed code 204 and, in response, display on the smartphone 202 the login information for accessing the BMC 130. In one embodiment, the displayed code 204 includes a QR code. The smartphone 202 has a digital camera 302 that is operative to capture the displayed code 204 on the management computer 110 in response to an interaction of the user 102 with the smartphone 202.

In one embodiment, the web-based application 114 executing on the management computer 110 is operative to provide a graphical user interface (GUI) with interactive user controls (see input boxes 120, 122, for example) displayed on the management computer 110 for receiving the first set of login data and second set of login data in response to an interaction of the user 102 with the controls 120, 122.

In yet another aspect, the present invention relates to a method 500 for managing user access to a service processor 130. In one embodiment, the method 500 includes the step of installing a management access module 134 on a management computer 110 that is communicatively coupled to a service processor 130. The service processor 130 is operative to perform management functions for at least one target computer 128. The management access module 134 is configured to, when executed by one or more processors (CPU 136 and/or CPU 422), cause the management computer 110 to perform functions for authenticating a user 102. The functions for authenticating the user 102 include receiving a first set of login data from the user 102 (see FIG. 5, step 513) and verifying whether the received first set of login data corresponds to an approved user of the management computer 110 (see FIG. 5, step 515), and, if the first set of login data corresponds to an approved user, generating and displaying a code 204 on the management computer 110 that is configured to be recognized only by a personal computing device 202 associated with the approved user (see FIG. 5, step 521). The personal computing device is separate from the management computer 110. The displayed code 204 includes visual representations of data which, when recognized by the personal computing device 202, cause the personal computing device 202 to provide login information for permitting the user 102 to access the service processor 130. The functions for authenticating the user further include receiving a second set of login data from the user 102 (see FIG. 5, step 533) and verifying whether the received second set of login data corresponds to the login information for permitting the user 102 to access to the service processor 130 (see FIG. 5, step 535), and, if the second set of login data corresponds to the login information for permitting the user 102 to access to the service processor 130, providing the user 102 with access to the service processor 130 via the management computer 110 (see FIG. 5, step 537). The functions for authenticating the user 102 further include causing one or more processors (CPU 136 and/or CPU 422) to execute the management access module 134.

In one embodiment, the method further includes the step of installing a user module 308 on a personal computing device 202 associated with the approved user (see FIG. 3). The user module 308 is configured to, when executed by one or more processors (CPU 310 and/or camera signal processor 312), cause the personal computing device 202 to process and recognize the visual representations of data in the displayed code 204 and, in response, display on the personal computing device 202 the login information for accessing the service processor 130. The method also includes the step of causing the one or more processors (CPU 310 and/or camera signal processor 312) to execute the user module 308.

In one embodiment, the personal communications device 202 has a means 302 for capturing an image 206 of the code 204 displayed on the management computer 110 and the method further includes the step of causing the personal computing device 202 to capture the image 206 of the code 204.

In one embodiment, the functions of processing and recognizing the visual representations of data in the code 204 (see FIG. 5, steps 525 and 527) are performed in response to receiving image data corresponding to the image 206 of the code 204 captured by the personal computing device 202. In one embodiment, the means 302 for capturing the image 206 of the code 204 includes a digital camera.

In one embodiment, the service processor 130 is configured as a baseboard management controller (BMC) that is operative to perform the management functions for the at least one target computer 128.

In one embodiment, the personal computing device 202 corresponds to a portable wireless communications device.

In one embodiment, the personal computing device 202 corresponds to a smartphone.

Now also referring to FIGS. 6 and 7, in one aspect, the present invention relates to a system 100, 600 for registering a personal computing device 202 to a service processor 130. In one embodiment, the system includes a computer-executable first registration module ("device registration module") 314 that is stored on a personal computing device 202. The first registration module is configured to, when executed by one or more processors (CPU 136 and/or CPU 422), perform functions that include providing a device identifier associated with the personal computing device 202 to a service processor 310 over a communications link (see FIG. 6, communications link comprising 601 and 125-127) (step 703). The system 100, 600 also includes a computer-executable second registration module ("SP registration module") 133 that is stored on the service processor 130. The second registration module 133 is configured to, when executed by one or more processors (CPU 136 and/or CPU 422), perform functions that include receiving the device identifier over the communications link (see FIG. 6, communications link comprising 601 and 125-127) (step 705); retrieving stored user access data associated with a particular user 102 of the personal computing device 202 who has authorization to remotely access the service processor 130 via a management computer 110 that is separate from the personal computing device 202 (step 707); generating a cryptographic key based on the device identifier and configuration data associated with firmware 135 of the service processor 130 (step 709); and providing the cryptographic key to the personal computing device 202 over the communications link (see FIG. 6, communications link comprising 601 and 125-127) (step 711).

The system 100, 600 also includes a computer-executable management access module 134 that is stored on the service processor 130. The management access module 134 is operatively coupled to the second registration module 133 and is configured to, when executed by one or more processors (CPU 136 and/or CPU 422), perform functions that include: retrieving the device identifier associated with the personal computing device 202 (step 521*a*); retrieving the cryptographic key corresponding to the device identifier (step 521*b*); and generating an encrypted code based on the cryptographic key (step 521*c*). The management access module 134 is further executable to cause the management computer 110 to display a visual representation 204 of the encrypted code to the authorized user 102 (step 521*d*). The user access data corresponds to a first set of login information which, when received from the authorized user 102 of the management computer 110, causes the management computer 110 to display the visual representation 204 of the encrypted code in response. The displayed visual representation 204 of the encrypted code is configured such as to, when recognized by the personal computing device 202, cause the personal computing device 202 to display a second set of login information to the authorized user 102. The second set of login information, when received from the authorized user 102 of the management computer 110, enables the authorized user 102 to access the service processor 130 in response. The first set of login data includes at least one of a username and password associated with the authorized user 102. The second set of login information as displayed on the personal computing device 202 includes a personal identification number (PIN) associated with the authorized user 102.

In one embodiment, the encrypted code is generated based on, in part, the current time of day.

In one embodiment, the visual representation 204 of the encrypted code is displayed as a QR code or barcode.

In one embodiment, the service processor 130 is configured as a baseboard management controller (BMC) that is operative to perform remote management functions for at least one target computer 128 (or any of server computers 140, 142, 144, or 146) that is separate from the management computer 110 and personal computing device 202.

In one embodiment, the communications link (see FIG. 6, communications link comprising 601 and 125-127) between the personal computing device 202 and the service processor 130 includes at least one of a USB connection, local area network (LAN) connection, wireless area network (WAN) connection, and Internet connection.

In another aspect, the present invention relates to a computer-implemented method 700 for registering a personal computing device 202 to a service processor 130. In one embodiment, the method includes the steps of causing one or more processors (CPU 136 and/or CPU 422) to execute a first registration module ("device registration module") 314 that is stored on a personal computing device 202 to perform functions that include providing a device identifier associated with the personal computing device 202 to a service processor 130 over a communications link (see FIG. 6, communications link comprising 601 and 125-127) (step 703). The method 700 further includes the step of causing one or more processors (CPU 136 and/or CPU 422) to execute a second registration module ("SP registration module") 133 on the service processor 130 to perform functions that include: (i) receiving the device identifier over the communications link (see FIG. 6, communications link comprising 601 and 125-127) (step 705); (ii) retrieving stored user access data associated with a particular user 102 of the personal computing device 202 who has authorization to remotely access the service processor 130 via a management computer 110 that is separate from the personal computing device 202 (step 707); (iii) generating a cryptographic key based on the device identifier and configuration data associated with firmware 135 of the service processor 130 (step 709); and (iv) providing the cryptographic key to the personal computing device 202 over the communications link (see FIG. 6, communications link comprising 601 and 125-127) (step 711).

In one embodiment, the method further includes the step of causing one or more processors (CPU 136 and/or CPU 422) to a execute a management access module 134 that is stored on the service processor 130 and operatively coupled to the second registration module ("SP registration module") 133 to perform functions that include: (a) retrieving the device identifier associated with the personal computing device 202 (step 521*a*); (b) retrieving the cryptographic key corresponding to the device identifier (step 521*b*); and (c) generating an encrypted code based on the cryptographic key (step 521*c*). The method also includes the step of causing the management computer 110 to display a visual representation 204 of the encrypted code to the authorized user 102 (step 521*d*). The user access data corresponds to a first set of login information which, when received from the authorized user 102 of the management computer 110, causes the management computer 110 to display the visual representation 204 of the encrypted code in response. The displayed visual representation 204 of the encrypted code is configured such as to, when recognized by the personal computing device 202, cause the personal computing device 202 to display a second set of login information to the authorized user 102 which, when received from the authorized user 102 the management computer 110, enables the authorized user 102 to remotely access the service processor 130 in response.

In one embodiment, the method further includes the step of causing the first registration module 314 to receive the cryptographic key from the second registration module 133 over the communications link (see FIG. 6, communications link comprising 601 and 125-127) and securely store the cryptographic key on the personal computing device 202 (step 713).

In one embodiment, the method also includes the step of securely storing the cryptographic key, device identifier, and user access data on the service processor 130 (step 715).

In one embodiment, the personal computing device 202 corresponds to a portable wireless communications device. In this embodiment, the device identifier corresponds to the predetermined international mobile equipment identity (IMEI) of the personal computing device 202.

In yet another aspect, the present invention relates to a computer-implemented method 700 for registering a personal computing device 202 to a service processor 130. In one embodiment, the method includes the step of installing a computer-executable first registration module ("device registration module") 314 on a personal computing device 202, the first registration module ("device registration module") 314 configured to, when executed by one or more processors (CPU 136 and/or CPU 422), cause the personal computing device 202 to perform functions that include providing a device identifier associated with the personal computing device 202 to a service processor 130 over a communications link (see FIG. 6, communications link comprising 601 and 125-127) (step 703). The method also includes the step of installing a computer-executable second registration module ("SP registration module") 133 on the service processor 130. The second registration module ("SP registration module") 133 is configured to, when executed by one or more processors (CPU 136 and/or CPU 422), cause the service processor 130 to perform functions that include: (i) receiving the device identifier over the communications link (see FIG. 6, communications link comprising 601 and 125-127) (step 705); (ii) retrieving stored user access data associated with a particular user of the personal computing device 202 who has authorization to remotely access the service processor 130 via a management computer 110 that is separate from the personal computing device 202 (step 707); (iii) generating a cryptographic key based on the device identifier and configuration data associated with firmware 135 of the service processor 130 (step 709); and (iv) providing the cryptographic key to the personal computing device 202 over the communications link (see FIG. 6, communications link comprising 601 and 125-127) (step 711). The method 700 also includes the step of causing one or more processors (CPU 136 and/or CPU 422) to execute the first registration module 314 and second registration module 133.

In one embodiment, the method further includes the step of installing a computer-executable management access module 134 on the service processor 130 that is operatively coupled to the second registration module ("SP registration module") 133. The management access module 134 is configured to, when executed by one or more processors (CPU 136 and/or CPU 422), cause the service processor 130 to perform functions that include: (i) retrieving the device identifier associated with the personal computing device 202 (step 521*a*); (ii) retrieving the cryptographic key corresponding to the device identifier (step 521*b*); and (iii) generating an encrypted code based on the cryptographic key (step 521*c*). The method also includes the step of causing the management computer 110 to display a visual representation 204 of the encrypted code to the authorized user 102 (step 521*d*). The user access data corresponds to a first set of login information which, when received from the authorized user 102 of the management computer 110, causes the management computer 110 to display the visual representation 204 of the encrypted code in response. The displayed visual representation 204 of the encrypted code are configured such as to, when recognized by the personal computing device 202, cause the personal computing device 202 to provide a second set of login information to the authorized user 102 which, when received from the authorized user 102 of the management computer 110, enables the authorized user 102 to remotely access the service processor 130 in response.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A system, comprising:
   a personal computing device, a service processor, and a management computer,
   (a) wherein the personal computing device stores a computer-executable first registration module, wherein the first registration module is configured to, when executed by one or more processors, perform functions including:

providing a device identifier associated with the personal computing device to a service processor over a communications link between the service processor and the management computer, receiving from the service processor a cryptographic key over the communications link, capturing an image of a visual representation of an encrypted code, decrypting data of the captured image based on the cryptographic key, generating a second set of login information based on the decrypted data, and displaying the second set of login information;

(b) wherein the service processor stores a computer-executable second registration module and a computer-executable management access module operatively coupled to the second registration module, wherein the second registration module is configured to, when executed by one or more processors, perform functions including:

(i) receiving the device identifier over the communications link;

(ii) retrieving stored user access data associated with the personal computing device;

(iii) generating the cryptographic key based on the device identifier and configuration data associated with firmware of the service processor; and (iv) providing the cryptographic key to the personal computing device over the communications link;

wherein the management access module is configured to, when executed by one or more processors, perform functions including:

(v) receiving a first set of login information from the management computer and matching the first set of login information with at least one first set of the stored user access data;

(vi) retrieving, when the first set of login information matches the at least one first set of the stored user access data, the device identifier associated with the personal computing device;

(vii) retrieving the cryptographic key corresponding to the device identifier;

(viii) dynamically generating the encrypted code based on the cryptographic key and transmitting the visual representation of the encrypted code to the management computer;

(ix) receiving the second set of login information from the management computer and matching the second set of login information with at least one second set of the stored user access data; and (x) granting, when the second set of login information matches the at least one second set of the stored user access data, remote access of the service processor to the management computer; and (c) wherein the management computer is separate from the personal computing device and communicatively coupled to the service processor via the communications link, wherein the management computer is configured to:

transfer the device identifier associated with the personal computing device to the service processor over the communications link, receive a first set of login information and transmit the first set of login information to the service processor, receive the second set of login information, and display the visual representation of the encrypted code received from the service processor.

2. The system of claim 1, wherein the first set of login data comprises at least one of a username and password.

3. The system of claim 2, wherein the second set of login information as displayed on the personal computing device comprises a personal identification number (PIN).

4. The system of claim 1, wherein the encrypted code is generated based on, in part, the current time of day.

5. The system of claim 1, wherein the visual representation of the encrypted code is displayed as a Quick Response (QR) code or barcode.

6. The system of claim 1, wherein the service processor is configured as a baseboard management controller (BMC) that is operative to perform remote management functions for at least one target computer that is separate from the management computer and personal computing device.

7. The system of claim 1, wherein the communications link between the personal computing device and the service processor comprises at least one of a USB connection, local area network (LAN) connection, wireless area network (WAN) connection, and Internet connection.

8. A computer-implemented method for registering a personal computing device to a service processor, comprising the steps of:

(a) executing, at one or more processors on a personal computing device, a first registration module stored on the personal computing device, and providing a device identifier associated with the personal computing device to a service processor over a communications link between the service processor and a management computer, wherein the management computer is separate from the personal computing device and communicatively coupled to the service processor via the communications link;

(b) executing, at one or more processors on the service processor, a second registration module on the service processor to perform functions including:

(i) receiving the device identifier over the communications link;

(ii) retrieving stored user access data associated with the personal computing device;

(iii) generating a cryptographic key based on the device identifier and configuration data associated with firmware of the service processor; and (iv) providing the cryptographic key to the personal computing device over the communications link;

(c) receiving, at the personal computing device, the cryptographic key from the service processor over the communications link;

(d) receiving, at the management computer, a first set of login information, and transferring the first set of login information to the service processor over the communications link;

(e) executing, at the one or more processors on the service processor, a management access module stored on the service processor and operatively coupled to the second registration module to perform functions including:

(v) receiving a first set of login information from the management computer and matching the first set of login information with at least one first set of the stored user access data;

(vi) retrieving, when the first set of login information matches the at least one first set of the stored user access data, the device identifier associated with the personal computing device;

(vii) retrieving the cryptographic key corresponding to the device identifier; and (viii) generating the encrypted code based on the cryptographic key and transmitting a visual representation of the encrypted code to the management computer; and (f) displaying, at the management computer, the visual representation;

(g) capturing, by the personal computing device, an image of the displayed visual representation;

(h) decrypting, at the personal computing device, data of the captured image based on the cryptographic key stored in the personal computing device, and generating a second set of login information based on decrypted data;

(i) displaying, at the personal computing device, the second set of login information;

(j) receiving, at the management computer, the second set of login information, and transferring the second set of login information to the service processor over the communications link; and (k) executing, at the service processor, the management access module to perform functions including:

(ix) receiving the second set of login information from the management computer and matching the second set of login information with at least one second set of the stored user access data; and (x) granting, when the second set of login information matches the at least one second set of the stored user access data, remote access of the service processor to the management computer.

9. The method of claim 8, further comprising the step of causing the first registration module to receive the cryptographic key from the second registration module over the communications link and securely store the cryptographic key on the personal computing device.

10. The method of claim 8, further comprising the step of securely storing the cryptographic key, device identifier, and user access data on the service processor.

11. The method of claim 8, wherein the personal computing device corresponds to a portable wireless communications device.

12. The method of claim 11, wherein the device identifier corresponds to the predetermined international mobile equipment identity (IMEI) of the personal computing device.

13. A computer-implemented method for registering a personal computing device to a service processor, comprising the steps of:

(a) installing a computer-executable first registration module on a personal computing device, the first registration module configured to, when executed by one or more processors, perform functions including:

providing a device identifier associated with the personal computing device to a service processor over a communications link between the service processor and the management computer, receiving from the service processor a cryptographic key over the communications link, capturing an image of a visual representation of an encrypted code, decrypting data of the captured image based on the cryptographic key, generating a second set of login information based on the decrypted data, and displaying the second set of login information;

(b) installing a computer-executable second registration module on the service processor, the second registration module configured to, when executed by one or more processors, perform function including:

(i) receiving the device identifier over the communications link;

(ii) retrieving stored user access data associated with the personal computing device who has authorization to remotely access the service processor via a management computer, wherein the management computer is separate from the personal computing device and communicatively coupled to the service processor via the communications link;

(iii) generating the cryptographic key based on the device identifier and configuration data associated with firmware of the service processor; and (iv) providing the cryptographic key to the personal computing device over the communications link;

(c) installing a computer-executable management access module operatively coupled to the second registration module, the management access module configured to, when executed by one or more processors, cause the service processor to perform functions that include:

(v) receiving a first set of login information from the management computer and matching the first set of login information with at least one first set of the stored user access data;

(vi) retrieving, when the first set of login information matches the at least one first set of the stored user access data, the device identifier associated with the personal computing device;

(vii) retrieving the cryptographic key corresponding to the device identifier;

(viii) generating the encrypted code based on the cryptographic key and transmitting the visual representation of the encrypted code to the management computer;

(ix) receiving the second set of login information from the management computer and matching the second set of login information with at least one second set of the stored user access data; and (x) granting, when the second set of login information matches the at least one second set of the stored user access data, remote access of the service processor to the management computer; and (d) executing, by one or more processors, the first registration module and the second registration module to register the personal computing device to the service processor;

(e) receiving, at the service processor, a first set of login information from the management computer and matching the first set of login information with at least one first set of the stored user access data;

(f) retrieving, at the service processor, when the first set of login information matches the at least one first set of the stored user access data, the device identifier associated with the personal computing device, and retrieving the cryptographic key corresponding to the device identifier;

(g) generating, at the service processor, the encrypted code based on the cryptographic key, and transmitting the visual representation of the encrypted code to the management computer;

(h) displaying, at the management computer, the visual representation;

(i) capturing, by the personal computing device, an image of the displayed visual representation;

(j) decrypting, at the personal computing device, data of the captured image based on the cryptographic key stored in the personal computing device, and generating a second set of login information based on decrypted data;

(k) displaying, at the personal computing device, the second set of login information;

(l) receiving, at the service processor, the second set of login information from the management computer and matching the second set of login information with at least one second set of the stored user access data; and (m) granting, at the service processor, when the second set of login information matches the at least one second set of the stored user access data, remote access of the service processor to the management computer.

14. The method of claim 8, wherein the encrypted code is generated based on, in part, the current time of day.

15. The method of claim 8, wherein the visual representation of the encrypted code is displayed as a Quick Response (QR) code or barcode.

16. The method of claim 13, wherein the encrypted code is generated based on, in part, the current time of day.

17. The method of claim 13, wherein the visual representation of the encrypted code is displayed as a Quick Response (QR) code or barcode.

* * * * *